United States Patent
Jang et al.

(10) Patent No.: US 7,936,716 B2
(45) Date of Patent: May 3, 2011

(54) RESOURCE ALLOCATING APPARATUS AND METHOD FOR SIMPLEX COMMUNICATION IN WIDEBAND WIRELESS COMMUNICATION SYSTEM

(75) Inventors: Jae-Hyuk Jang, Suwon-si (KR); Jung-Je Son, Seongnam-si (KR); Nam-Gi Kim, Suwon-si (KR); Min-Hee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 11/834,798

(22) Filed: Aug. 7, 2007

(65) Prior Publication Data

US 2008/0032699 A1   Feb. 7, 2008

(30) Foreign Application Priority Data

Aug. 7, 2006 (KR) .................. 10-2006-0074152

(51) Int. Cl.
  *H04Q 7/00* (2006.01)
(52) U.S. Cl. ............... 370/329; 455/518; 455/452.1; 455/509; 455/519
(58) Field of Classification Search .......... 455/509, 455/452.1, 450, 451, 420, 456.5, 464, 9, 455/515, 556.1, 406, 432.1, 507, 518, 512, 561; 370/329, 338, 328
See application file for complete search history.

(56) References Cited

U.S. PATENT DOCUMENTS

| | | | |
|---|---|---|---|
| 6,640,248 B1 * | 10/2003 | Jorgensen | 709/226 |
| 2005/0064888 A1 * | 3/2005 | Schaefer et al. | 455/509 |
| 2006/0058008 A1 * | 3/2006 | Choksi | 455/406 |
| 2006/0116150 A1 * | 6/2006 | Bhutiani | 455/518 |
| 2007/0038751 A1 * | 2/2007 | Jorgensen | 709/226 |
| 2007/0049314 A1 * | 3/2007 | Balachandran et al. | 455/518 |
| 2009/0185527 A1 * | 7/2009 | Akhtar et al. | 370/329 |

FOREIGN PATENT DOCUMENTS

| | | |
|---|---|---|
| KR | 10-2004-0093530 A | 11/2004 |
| KR | 10-2006-0014737 A | 2/2006 |
| KR | 10-2006-0038544 A | 5/2006 |
| KR | 10-2006-0056682 A | 5/2006 |

* cited by examiner

*Primary Examiner* — Tan Trinh
(74) *Attorney, Agent, or Firm* — Jefferson IP Law, LLP

(57) ABSTRACT

A resource allocating apparatus and a method for a Push-To-Talk (PTT) service in a wideband wireless communication system are provided. The method includes, when a Floor Grant message is received from a PTT server, allocating an uplink resource to a corresponding terminal and when a Floor Release message is received from the terminal, aborting the uplink resource allocation. The uplink resource is allocated only to the terminal having the data to be transmitted, and the resources are not allotted to terminals having no data to send.

3 Claims, 6 Drawing Sheets

RESOURCE ALLOCATING APPARATUS AND METHOD FOR SIMPLEX COMMUNICATION IN WIDEBAND WIRELESS COMMUNICATION SYSTEM

PRIORITY

This application claims the benefit under 35 U.S.C. §119 (a) to a Korean patent application filed in the Korean Intellectual Property Office on Aug. 7, 2006 and assigned Serial No. 2006-0074152, the entire disclosure of which is hereby incorporated by reference.

BACKGROUND OF THE INVENTION

1. Field of the Invention

The present invention relates generally to a wideband wireless communication system. More particularly, the present invention relates to a resource allocating apparatus and method for performing a Push-To-Talk (PTT) service, which is a simplex communication, in a wideband wireless communication system.

2. Description of the Related Art

In a fourth generation (4G) communication system, research has been conducted to provide users with various Quality of Services (QoSs) at a data rate of about 100 Mbps. Specifically, research of the 4G communication system has been conducted into a high rate service support to guarantee mobility and QoS in Broadband Wireless Access (BWA) communication systems such as Local Area Network (LAN) systems and Metropolitan Area Network (MAN) systems. Representative 4G communication systems include Institute of Electrical and Electronics Engineers (IEEE) 802.16 wideband radio communication systems, which standard is hereby incorporated by reference.

The wideband wireless communication system defines a variety of resource allocation methods, which include an Unsolicited Grant Service (UGS) for periodically allocating data resources of a fixed size without a resource allocation request, a real-time Polling Service (rtPS) for periodically allocating resources that allow the resource allocation request, an extended rtPS (ertPS) for periodically allocating data resources of a variable size as requested, a non-real-time Polling Service (nrtPS) for aperiodically allocating resources that can request the resource allocation, and a Best Effort (BE) for requesting the resource allocation through a random access.

For communications in a wideband wireless communication system, it is necessary to efficiently allocate resources using the above mentioned resource allocation methods. For example, for a Push-To-Talk (PTT) service of the simplex communication service, an efficient resource allocation method is needed. The PTT service is the simplex communication service for allowing only one user to speak at one time. The user presses a PTT button to talk. By releasing the pressing of the PTT button to finish the speaking, the user can hear the other party.

FIG. 1 illustrates a conventional PTT service procedure.

Referring to FIG. 1, when an event for a PTT service with a terminal B 170 is generated according to a key manipulation of a user in step 101, a terminal A 150 establishes a session for the PTT service by transmitting and receiving Session Initiation Protocol (SIP) messages to and from the terminal B 170 via a PTT server 160 in step 103.

The PTT server 160 sends a Floor Grant message to the terminal A 150 which commences the PTT service in step 105, and sends a Floor Taken User_A message of the terminal A 150 to the terminal B 170 in step 107. The terminal A 150, which is granted the floor, transmits user's speaking to the PTT server 160 according to a Real-time Transmission Protocol (RTP) in step 109. The PTT server 160 forwards the received speaking of the terminal A 150 to the terminal B 170 according to the RTP in step 111.

Next, when an event for finishing the talking is generated by the key manipulation of the user in step 113, the terminal A 150 sends a Floor Release Message to the PTT server 160 in step 115. Upon receiving the Floor Release message, the PTT server 160 informs the terminal A 150 and the terminal B 170 of a current idle channel by sending a Floor Idle message to them in steps 117 and 119.

When an event for the speaking start is generated by a user's key manipulation in step 121, the terminal B 170 sends a Floor Request message to the PTT server 160 in step 123. The PTT server 160, upon receiving the Floor Request message, sends a Floor Grant message to the terminal B 170 in step 125 and sends a Floor Taken User_B of the terminal B 170 to the terminal A 150 in step 127.

In step 129, the terminal B 170 transmits user's speaking to the PTT server 160 according to the RTP. The PTT server 160 forwards the speaking of the terminal B 170 to the terminal A 150 in step 131.

When a Floor Release event is generated in step 133, the terminal B 170 sends a Floor Release message to the PTT server 160 in step 135. The PTT server 160 sends a message informing of the current idle channel to the terminal A 150 and the terminal B 170 in steps 137 and 139. When the speaking is not requested over a certain time, the terminal A 150 and the terminal B 170 terminate the PTT session in step 141.

As above, the PTT service allows only one user to speak at one time and transmits data of the user's speaking in real time. The PTT service can allocate resources using the UGS, the rtPS, and the ertPS which support the real time service among the above-mentioned resource allocation methods. However, as for the UGS, the resources are allocated to every user of the PTT service. Unnecessarily, the uplink resource is periodically allocated to the user who is not talking. In case of the rtPS, the uplink resource for requesting the resource allocation is unnecessarily allocated on a periodic basis to the user who cannot talk due to the other user's speaking. In case of the ertPS, a Channel Quality Indicator (CQI) channel is fixedly allocated.

SUMMARY OF THE INVENTION

An aspect of the present invention is to substantially solve at least the above mentioned problems and/or disadvantages and to provide at least the advantages described below. Accordingly, an aspect of the present invention is to provide a resource allocating apparatus and method for a PTT service in a wideband wireless communication system.

Another aspect of the present invention is to provide an apparatus and method for allocating an uplink resource to a terminal which requires the uplink resource for a PTT service in a wideband wireless communication system.

According to an aspect of the present invention, a method of a Base Station for allocating resources in a wideband wireless communication system is provided. The method includes, when a Floor Grant message is received from a PTT server, allocating an uplink resource to a corresponding terminal, and, when a Floor Release message is received from the terminal, aborting the uplink resource allocation.

According to another aspect of the present invention, a method of a terminal for performing a PTT service in a wideband wireless communication system is provided. The method includes, when a Floor Grant message is received from a PTT server, allocating an uplink resource from a Base Station (BS), and transmitting voice data of a user to other terminal using the allocated uplink resource.

According to another aspect of the present invention, a BS for allocating resources in a wideband wireless communication system is provided. The BS includes a packet classifier for determining whether a Floor Grant message is received from a PTT server, a packet analyzer for determining whether a Floor Release message is received from a terminal, a call manager for requesting resource allocation to a scheduler when a signal informing of the reception of the Floor Grant message is input from the packet classifier and for requesting resource allocation abortion to the scheduler when a signal informing of the reception of a Floor Release message is input from the packet analyzer, and the scheduler for allocating an uplink resource to a corresponding terminal and aborting the uplink resource allocation according to the request of the call manager.

According to a further aspect of the present invention, a terminal for performing a PTT service in a wideband wireless communication system is provided. The terminal includes a controller for determining whether a Floor Grant message is received from a PTT server and for requesting to generate a Dynamic Service Addition REQuest (DSA-REQ) message when the Floor Grant message is received, a message generator for generating the DSA-REQ message which requests resource allocation for a PTT service according to the request, and a transceiver for transmitting the DSA-REQ message to a corresponding BS.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a resource allocating apparatus and method for performing a Push-To-Talk (PTT) service, which is a simplex communication, in a wideband wireless communication system. In the following explanation, a PTT control message indicates a message transmitted and received to execute the PTT service, that is, a Floor Request message, a Floor Grant message, a Floor Taken message of other users, a Floor Release message, and a Floor Idle message.

Figure 1:
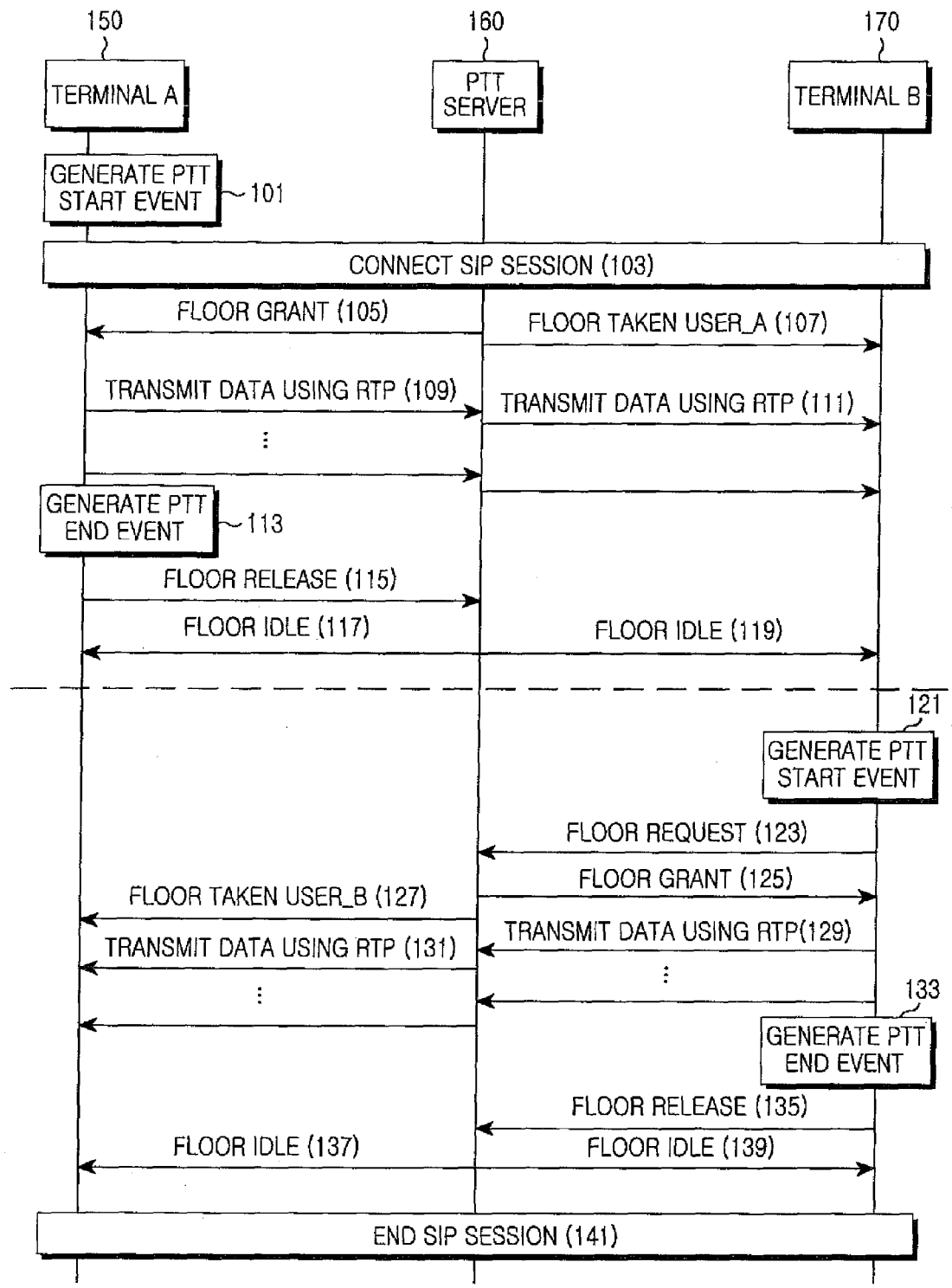
FIG. 1 illustrates a conventional PTT service procedure.
Figure 2:
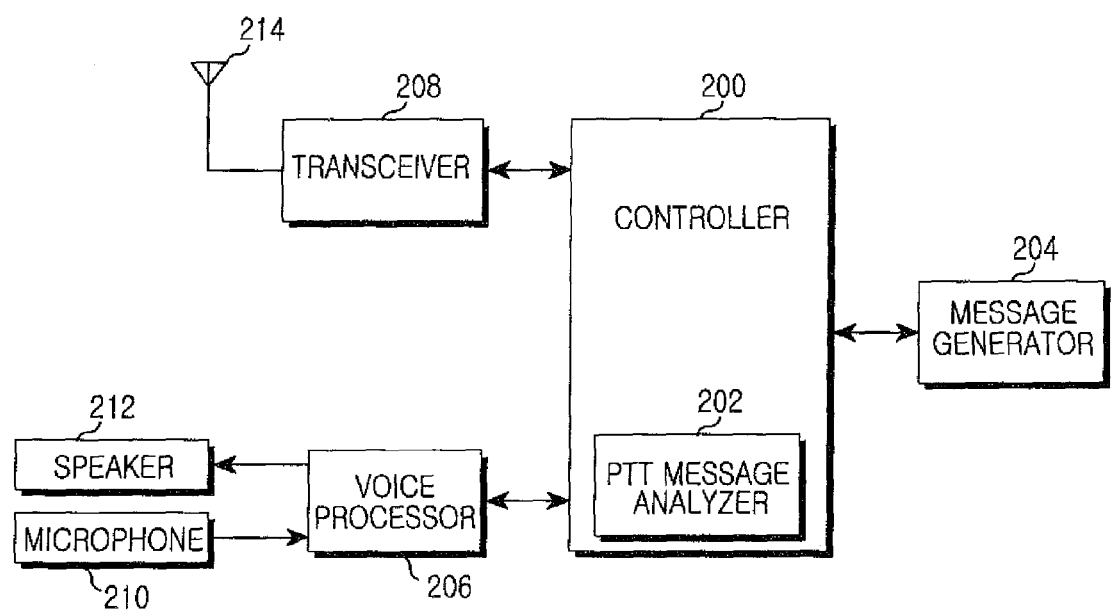
FIG. 2 is a block diagram of a terminal in a wideband wireless communication system according to an exemplary embodiment of the present invention.

FIG. 2 is a block diagram of a terminal in a wideband wireless communication system according to an exemplary embodiment of the present invention. The terminal includes a controller 200, a PTT message analyzer 202, a message generator 204, a voice processor 206, a transceiver 208, a microphone 210, a speaker 212, and an antenna 214.

The controller 200 in FIG. 2 controls and processes overall functions for the PTT service. Specifically, the controller 200 includes the PTT message analyzer 202 to analyze a PTT control message which is received from a PTT server through a Base Station (BS). In other words, the PTT message analyzer 202 determines whether the received PTT control message is a Floor Grant message. When the Floor Grant message is received, the controller 200 requests the message generator 204 to generate a Dynamic Service Addition REQuest (DSA-REQ) message.

The message generator 204 generates a Floor Request message and a Floor Release message under the control of the controller 200. When the DSA-REQ message generation is requested from the controller 200, the message generator 204 generates the DSA-REQ message for the resource allocation. The DSA-REQ message includes a Type-Length-Value (TLV) to request a resource allocation method as shown in Table 1.

TABLE 1

| Type | Length | Value | Scope |
|---|---|---|---|
| 145.11 | 1 | 0: Reserved<br>1: for Undefined<br>2: for BE(default)<br>3: fot nrtPS<br>4: for rtPS<br>5: for Extended nrtPS<br>6: for UGS<br>7: for PTT<br>8-255: Reserves | DSA-REQ<br>DSA-RSP<br>DSA-ACK |

Table 1 shows a construction of uplink grant scheduling type TLV contained in the DSA-REQ message. Values 2 through 6 indicate conventional resource allocation methods of UGS, rtPS, ertPS, nrtPS and BE. Value 7 indicates a resource allocation for the PTT service according to an exemplary embodiment of the present invention. Value 1 indicates no specific resource allocation method. Value 0 and 8~255 are reserved values.

The message generator 204 generates a DAS-REQ message including an uplink grant scheduling type 7 to allocate the resource for the PTT service execution and outputs the DSA-REQ message to the controller 200.

The voice processor 206, which includes a Coder-Decoder (CODEC), processes the input and the output of a voice signal through the microphone 210 and the speaker 212 connected to the voice processor 206.

The transceiver 208 includes coder/decoder, Orthogonal Frequency Division Modulation (OFDM) modulator/demodulator, Digital-Analog Converter (DAC)/Analog-Digital Converter (ADC), and a Radio Frequency (RF) processor, which are not shown. The transceiver 208 processes messages exchanged between the terminal and the BS according to the corresponding communication system and transceives the messages on the antenna 214.

Figure 3:
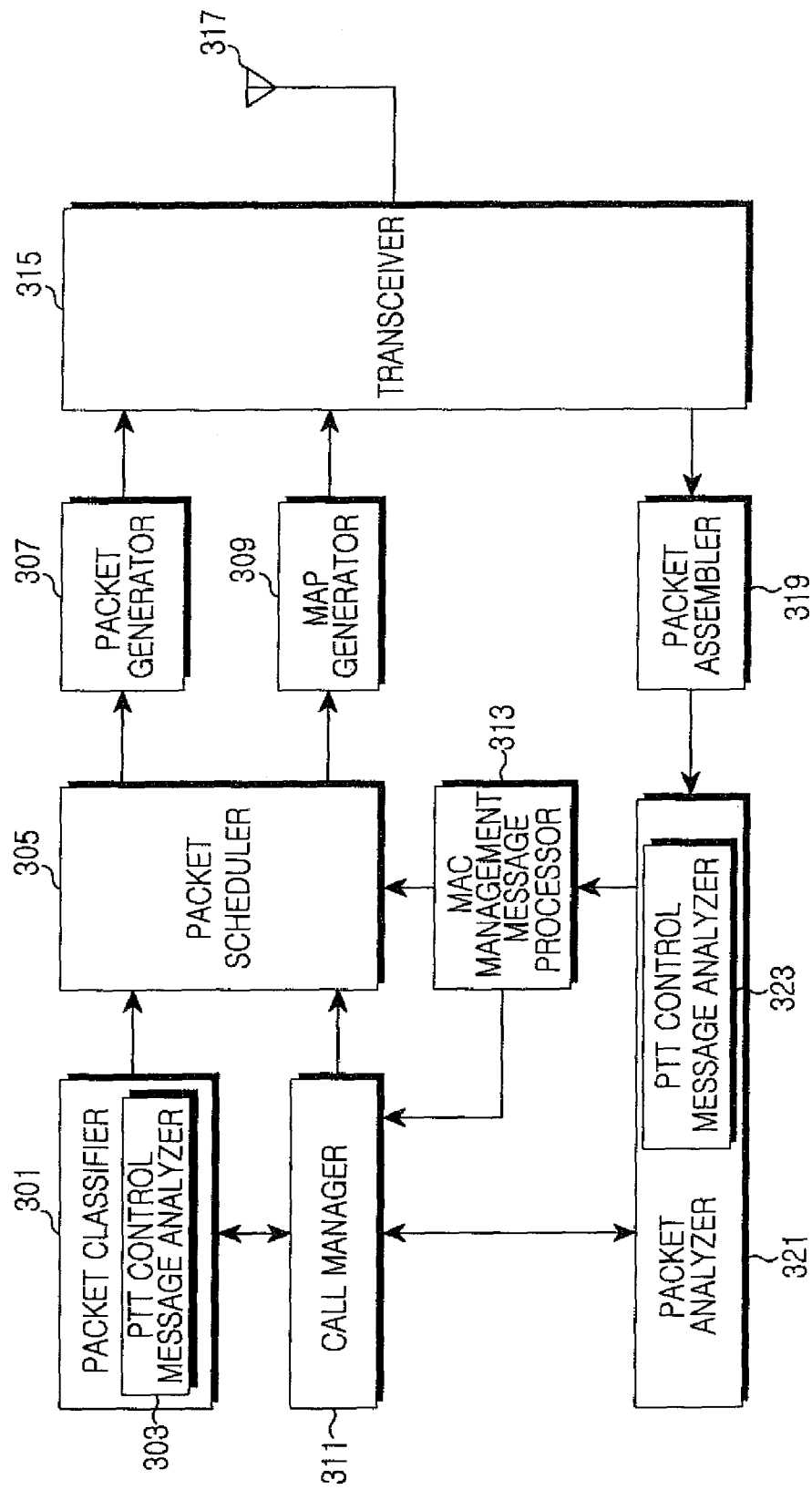
FIG. 3 is a block diagram of a Base Station (BS) in a wideband wireless communication system according to an exemplary embodiment of the present invention.

FIG. 3 is a block diagram of a BS in a wideband wireless communication system according to an exemplary embodiment of the present invention. The BS includes a packet classifier 301, a PTT control message analyzer 303, a packet scheduler 305, a packet generator 307, a MAP generator 309, a call manager 311, a MAC management message processor 313, a transceiver 315, an antenna 317, a packet assembler 319, a packet analyzer 321 and a PTT control message analyzer 323.

The packet classifier 301 of FIG. 3 determines a connection type of packets by analyzing IP addresses and port numbers of the packets input over the network. In more detail, the packet classifier 301 compares a RTP Control Protocol (RTCP) port number of the PTT service pre-registered to the call manager 311 with the port number of the input packet and determines whether the input packet is a PTT control message to control the PTT service. When the packet is the PTT control message, the packet classifier 301 analyzes the PTT control message using the PTT control message analyzer 303 provided therein. When the PTT control message is a Floor Grant message according to the analysis result, the packet classifier 301 informs the call manager 311 of the reception of the Floor Grant message.

The packet scheduler 305 schedules uplink and downlink resource allocation of corresponding terminals belonging to the BS based on packets generated at the MAC management message processor 313 and the packets received over the network. When the resource allocation is requested from the call manager 311, the packet scheduler 305 schedules to allocate the uplink resource to the corresponding terminal. When the resource allocation abortion is requested from the call manager 311, the packet scheduler 305 aborts the resource allocation to the corresponding terminal.

The packet generator 307 generates a packet by receiving data to be sent in the downlink from the packet scheduler 305. The MAP generator 309 generates MAP information for the downlink and uplink resource allocations based on the scheduling information fed from the packet scheduler 305.

The call manager 311 stores information relating to the call connected to the BS. More specifically, the call manager 311 receives and stores information relating to the call for the PTT service, for example, resource allocation information, IP address, and RTCP port number of the PTT service, from the MAC management message processor 313. When receiving the signal which informs of the reception of the Floor Grant message from the packet classifier 301, the call manager 311 analyzes whether the call for the PTT service is established with the corresponding terminal. When the call is established, the call manager 311 requests the packet scheduler 305 to allocate the uplink resource for the corresponding terminal. When receiving the signal which informs of the reception of the Floor Release message from the packet analyzer 321, the call manager 311 requests the packet scheduler 305 to abort the uplink resource allocation to the corresponding terminal.

The MAC management message processor 313 outputs information relating to the additional call to the call manager 311 when the message fed from the packet analyzer 321 is the DSA-REQ message. When the additional call is for the PTT service by determining the TLV indicative of the uplink grant scheduling type in the DSA-REQ message, the MAC management message processor 313 stores information which represents the call is for the PTT service, to the call manager 311.

Although not shown, the transceiver 315 includes coder/decoder, OFDM modulator/demodulator, DAC/ADC and an RF processor. The transceiver 315 processes messages exchanged between the BS and the terminal according to the corresponding communication system and transceives the processed messages on the antenna. Specifically, the transceiver 315 transmits the packet and the MAP information fed from the packet generator 307 and the MAP generator 309 to the corresponding terminal over the antenna 317, receives a signal from the terminal in the uplink over the antenna 317, and outputs the received signal to the packet assembler 319.

The packet assembler 319 reassembles the packet fed from the transceiver 315 and outputs the reassembled packet to the packet analyzer 321.

The packet analyzer 321 determines whether the packet is a MAC management message by analyzing the reassembled packet fed from the packet assembler 319. When the packet is the MAC management message, the packet analyzer 321 outputs the packet to the MAC management message processor 313. When the packet is not the MAC management message, the packet is re-transmitted over the network. The packet analyzer 321 receives the IP address and the port number of the PTT service from the call manager 311, sorts out the PTT control message in the packets retransmitted over the network, and determines whether the PTT control message is a Floor Release message using the PTT control message analyzer 323 provided therein. When the PTT control message is the Floor Release message, the packet analyzer 321 outputs a signal informing of the reception of the Floor Release message to the call manager 311.

Figure 4:
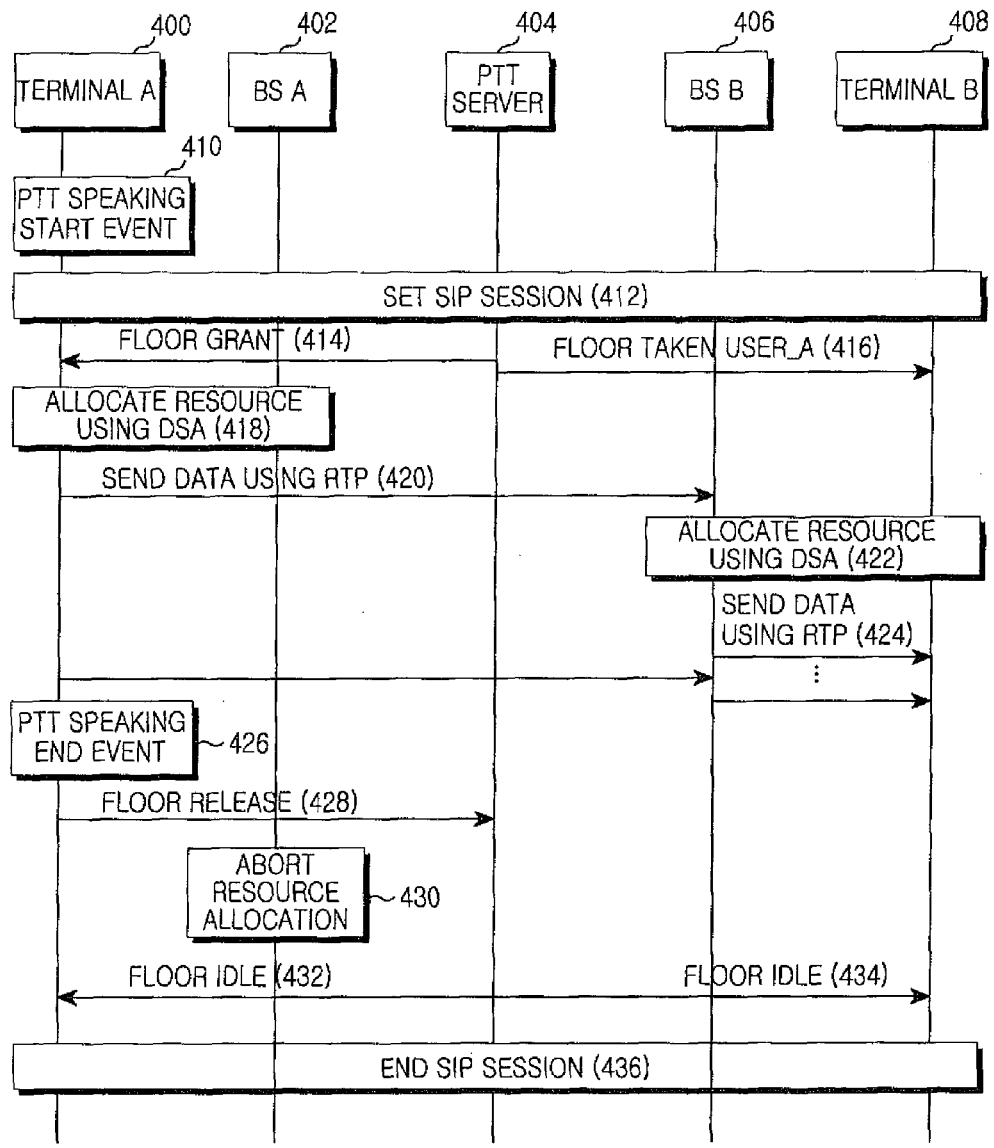
FIG. 4 is a diagram illustrating a PTT service procedure in a wideband wireless communication system according to an exemplary embodiment of the present invention.

FIG. 4 is a diagram illustrating a PTT service procedure in a wideband wireless communication system according to an exemplary embodiment of the present invention.

Referring to FIG. 4, when an event is generated to commence speaking to a terminal B 408 using a PTT service by a key manipulation of the user in step 410, a terminal A 400 establishes a session for the PTT service by transmitting and receiving Session Initiation Protocol (SIP) messages to and from the terminal B 408 via a PTT server 404 in step 412. The terminal A 400 and the terminal B 408 can transmit and receive the SIP messages through a default BE connection generated for the data communication in the initial phase without transmitting and receiving DSA messages for the session establishment by determining whether the message is the SIP message through the port number 5060 in the SIP message. In a speaking start event, when the PTT session is already established, the terminal A 400 sends a Floor Request message to the PTT server 404 without establishing the session using the SIP message.

The PTT server 404 sends a Floor Grant message to the terminal A 400 which commences the PTT service in step 414, and sends a Floor Taken User_A informing of the speaking of the terminal A 400 to the terminal B 408 in step 416.

Next, the terminal A 400 sends a DSA-REQ message requesting the uplink resource allocation for the PTT service to a corresponding BS A 402 in step 418. In doing so, the terminal A 400 can represent that the session between the BS and the terminal is for the PTT service by including the TLV value 7 indicative of the uplink grant scheduling type in the DSA-REQ message as shown in Table 1. Upon receiving the DSA-REQ message in step 418, the BS A 402 establishes a session with the terminal A 400 by sending a DSA-response (RSP) message to the terminal A 400, and allocates the uplink resource to the terminal A 400. The uplink resource allocation method can employ the method such as UGS which periodically allocates data resource of a fixed size. If the BS A 402 already knows the commencement of the PTT service through a separate signaling over IMS core network, it may attempt the resource allocation to the terminal after the step 412.

The terminal A 400 transmits the user's speaking to a corresponding BS B 406 of the terminal B 408 using the resource allocated from the BS A 402 according to the RTP in step 420. The BS B 406 allocates downlink resource to the terminal B 408 through the DSA message exchange in step 422 and forwards the speaking of the terminal A 400 to the terminal B 408 according to the RTP in step 424. At this time, the BS B 406 may forward the data to the terminal B 408 using the default BE connection generated for the data communication in the initial phase, without transmitting and receiving DSA messages in step 422.

When an event for finishing the speaking is generated by the key manipulation of the user in step 426, the terminal A 400 sends a Floor Release message to the PTT server 404 in step 428. In step 430, the BS A 402 detects the uplink release of the terminal A 400 by analyzing the Floor Release message and aborts the uplink resource allocation to the terminal A 400.

Upon receiving the Floor Release message, the PTT server 404 sends a Floor Idle message informing of the current idle channel to the terminal A 400 and the terminal B 408 in steps 432 and 434. When the speaking is not requested over a certain time, the terminal A 400 and the terminal B 408 end the established PTT session in step 436.

Figure 5:
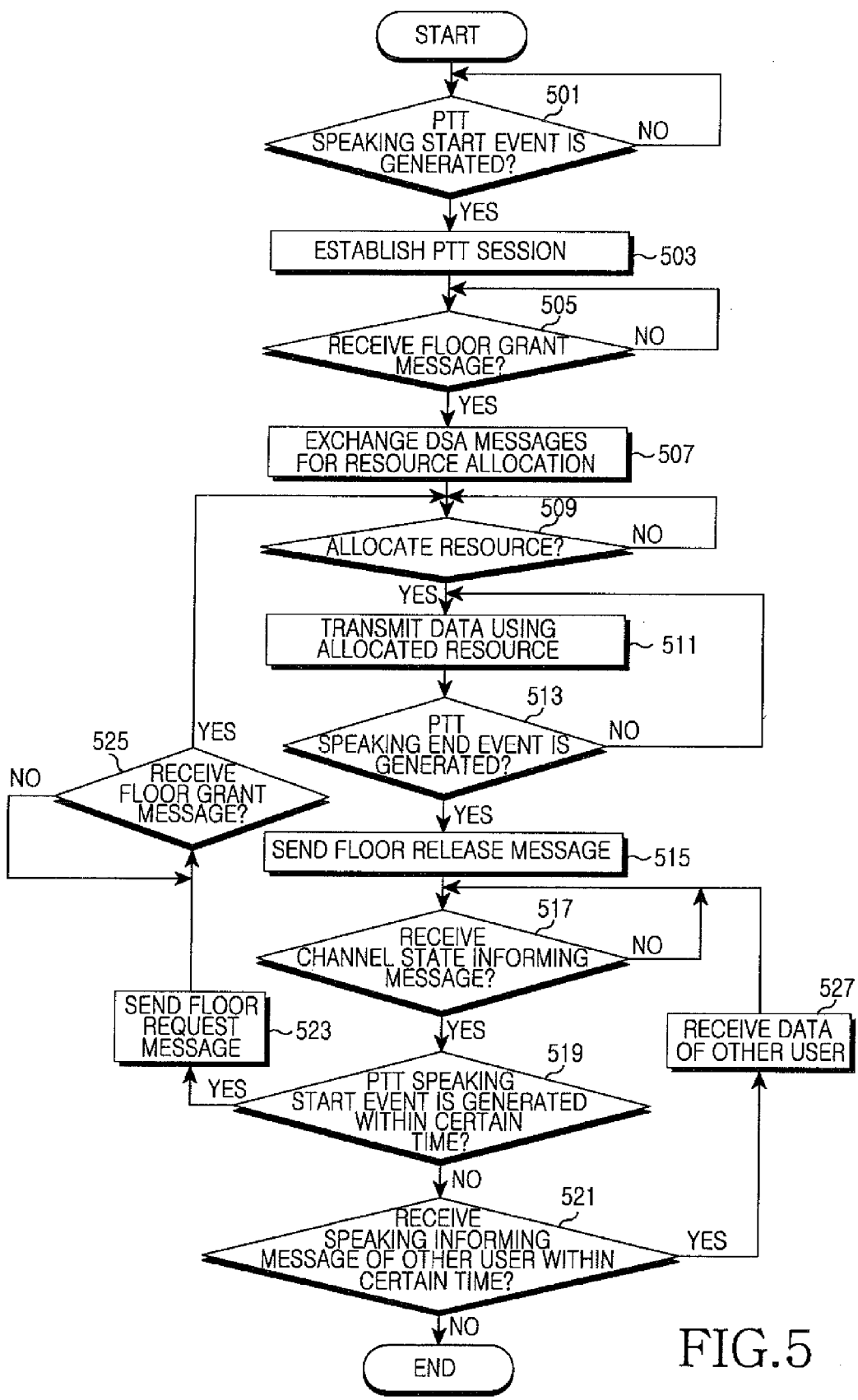
FIG. 5 is a diagram illustrating operations of a terminal for a PTT service in a wideband wireless communication system according to an exemplary embodiment of the present invention.

FIG. 5 is a diagram illustrating operations of a terminal for a PTT service in a wideband wireless communication system according to an exemplary embodiment of the present invention.

In FIG. 5, the terminal determines whether an event for starting the talking to the other terminal using the PTT service is generated by the key manipulation of the user in step 501. When the event is generated, the terminal establishes the session for the PTT service by transmitting and receiving the SIP message with the other terminal via the PTT server in step 503.

The terminal determines whether a Floor Grant message is received from the PTT server in step 505. When the Floor Grant message is received, the terminal transmits a DSA-REQ message to a corresponding BS to request the resource allocation for the PTT service and receives a DSA-RSP message from the BS in reply to the DSA-REQ message in step 507. The DSA-REQ message can request the resource allocation for the PTT service to the BS by including Value 7 as the uplink grant scheduling type as shown in Table 1.

In step 509, the terminal determines whether the resource is allocated from the BS. When the resource is allocated, the terminal confirms the allocated uplink resource and transmits voice data of the user to the other terminal using the resource in step 511. The voice data is transmitted using the RTP.

Next, the terminal examines whether an event of the speaking end is generated by the user's key manipulation in step 513. When the Floor Release event is not generated, the terminal returns to step 511 to keep the voice data transmission. When the Floor Release event is generated, the terminal sends a Floor Release message to the PTT server in step 515.

In step 517, the terminal determines whether a message informing of the idle state of the channel is received from the PTT server. When the terminal receives the message informing of the idle channel state, the terminal examines whether a speaking start event through the PTT service is generated by the user within a certain time in step 519. When the speaking start event is generated, the terminal sends a Floor Request message to the PTT server in step 523 and determines whether a Floor Grant message is received from the PTT server in step 525. Upon receiving the Floor Grant message, the terminal determines whether a message for allocating the resource is received from the BS in step 509 and re-executes the subsequent steps. At this time, since the session for the PTT service is pre-established between the BS and the terminal, the uplink resource can be allocated from the BS without the DSA message exchanges.

In contrast, when the speaking start event is not generated in step 519, the terminal determines whether a message informing of the talking of the other terminal is received from the PTT server within the certain time in step 521. When receiving the message informing of the talking, the terminal receives voice data from the other terminal in step 527 and determines whether a message informing of the idle channel state owing to the end of the talking of the other terminal is received in step 517.

When not receiving the message informing of the talking in step 521, the terminal finishes this algorithm.

Figure 6:
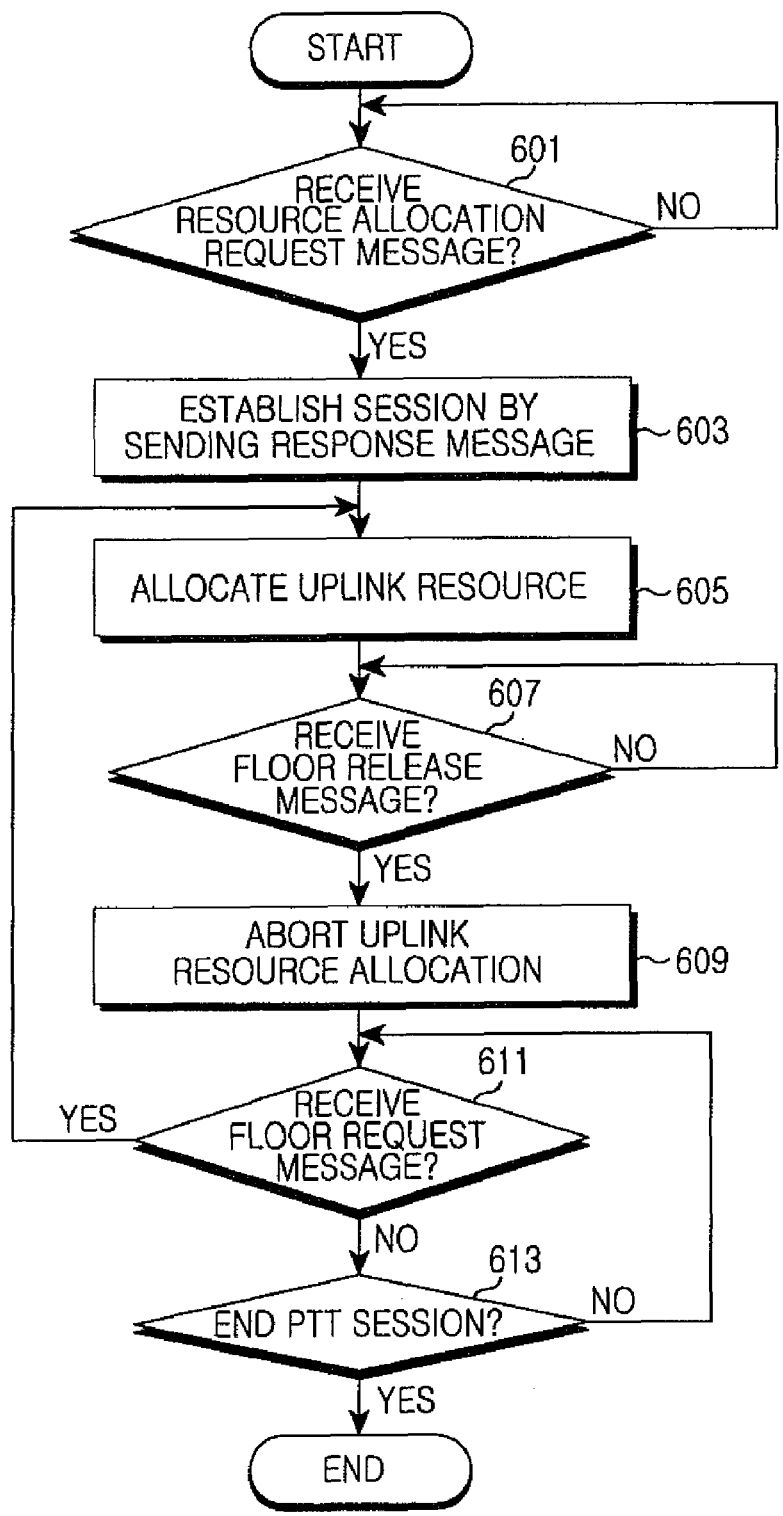
FIG. 6 illustrates operations of a BS to allocate resources for a PTT communication service in a wideband wireless communication system according to an exemplary embodiment of the present invention.

FIG. 6 is a diagram illustrating operations of a BS to allocate resources for a PTT communication service in a wideband wireless communication system according to an exemplary embodiment of the present invention.

In FIG. 6, the BS determines whether a DSA-REQ message requesting an uplink resource allocation for a PTT service is received in step 601. By examining the uplink grant scheduling type in the DSA-REQ message, the BS can confirm the resource allocation for the PTT service requested by the terminal which transmitted the DSA-REQ message.

Receiving the DSA-REQ message requesting the resource allocation, the BS establishes a session for the PTT service by sending a DSA-RSP message to the terminal in step 603 and allocates the uplink resource to the terminal through UL-MAP in step 605.

Next, the BS determines whether a Floor Release message is received from the terminal in step 607. Upon receiving the Floor Release message, the BS aborts the uplink resource allocation in step 609.

In step 611, the BS determines whether a Floor Request message is received within a certain time. When receiving the Floor Request message, the BS returns to step 605 to allocate the uplink resource to the terminal through the UL-MAP and then re-executes the subsequent steps.

In contrast, when receiving no Floor Request message, the BS ends the PTT session with the terminal in step 613. The PTT session end is determined by the terminal, and the BS can learn the PTT session end through Dynamic Service Deletion (DSD) message exchanges. Next, the BS finishes this algorithm.

As set forth above, in an exemplary PTT service in the wideband wireless communication system, the uplink resource is allocated only to the terminal having the data to be transmitted owing to the user's speaking. Hence, the resources are not allotted to terminals having no data to send. As a result, the resources are not wasted unnecessarily and can be allocated efficiently.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Base Station (BS) for allocating resources in a wideband wireless communication system, the BS comprising:
    a packet classifier for determining whether a Floor Grant message is received from a Push-To-Talk (PTT) server;
    a packet analyzer for determining whether a Floor Release message is received from a terminal;
    a call manager for requesting resource allocation to a scheduler when a signal informing of the reception of the Floor Grant message is input from the packet classifier, and for requesting resource allocation abortion to the scheduler when a signal informing of the reception of a Floor Release message is input from the packet analyzer; and
    the scheduler for allocating an uplink resource to a corresponding terminal and for aborting the uplink resource allocation according to the request of the call manager.

2. The BS of claim 1, further comprising a MAC management message processor for determining whether a session with the terminal is for a PTT service by analyzing a Dynamic Service Addition REQuest (DSA-REQ) message received from the terminal and for outputting the determination result to the call manager.

3. The BS of claim 2, wherein the DSA-REQ message comprises uplink grant scheduling type information which indicates the resource allocation request for the PTT service.

* * * * *